Feb. 21, 1939.  R. KOETS  2,148,270
TRAILER
Filed Jan. 7, 1937   5 Sheets-Sheet 1
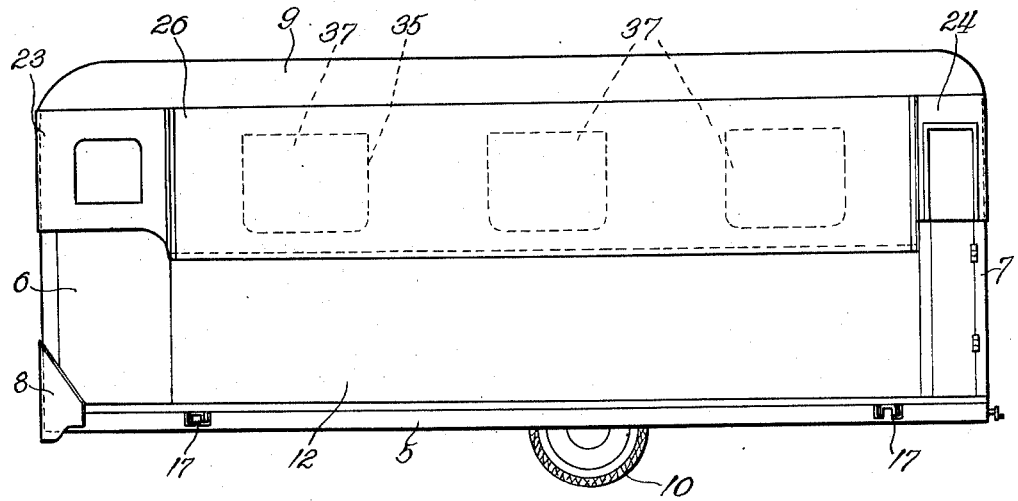
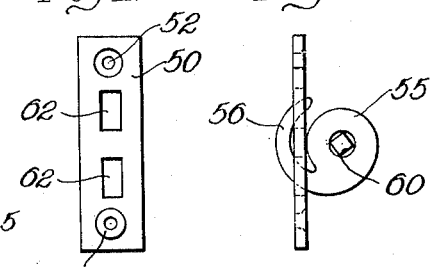
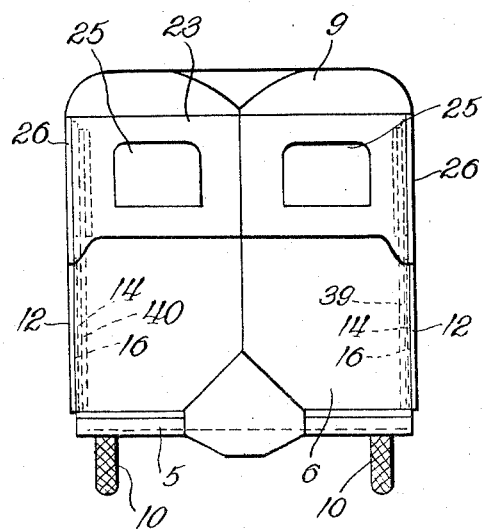
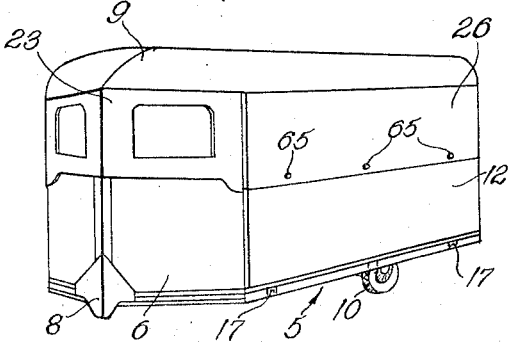
Inventor
Raymond Koets
By Walter E. Schirmer
Atty.

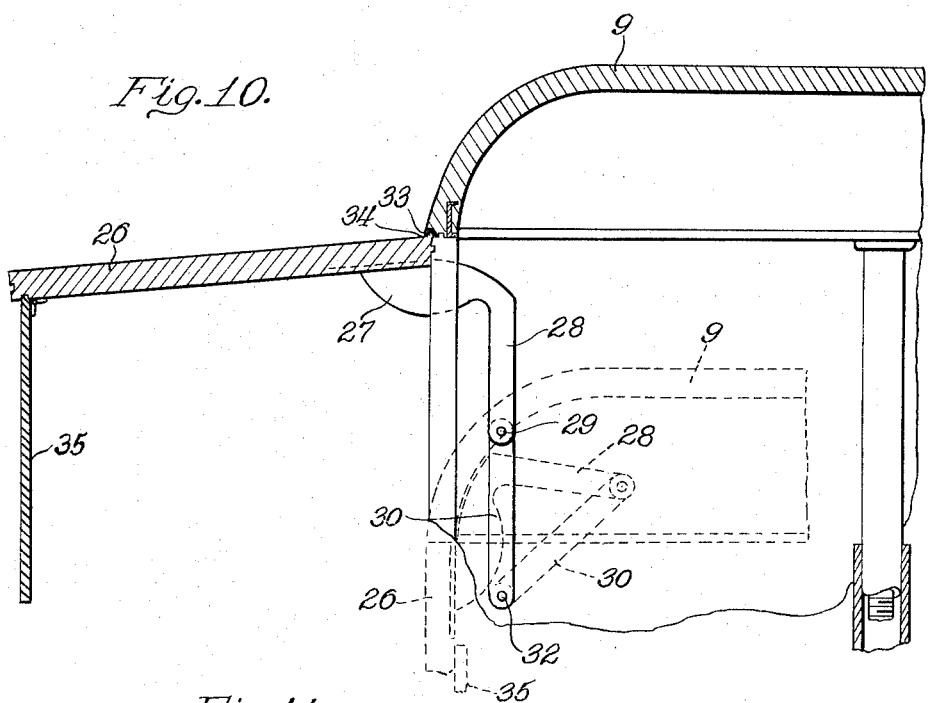
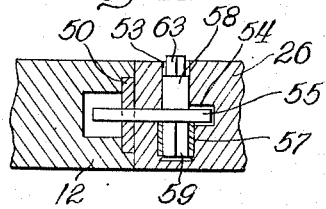
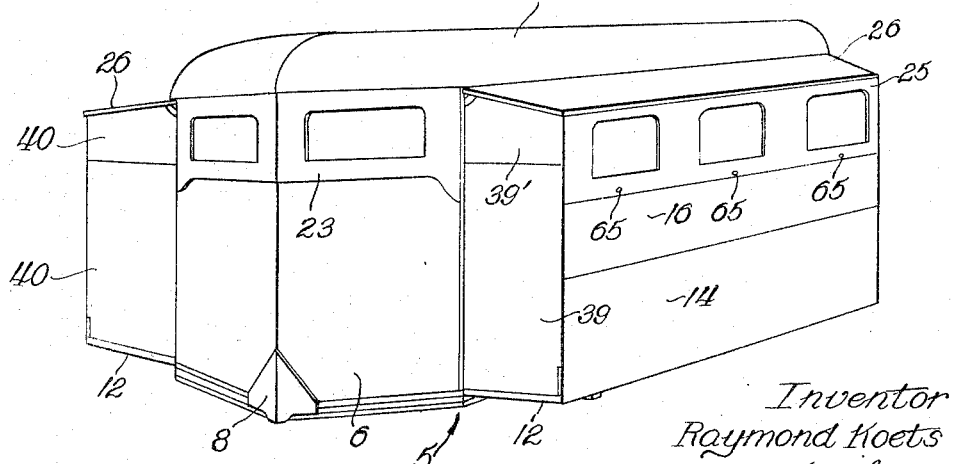

Feb. 21, 1939.    R. KOETS    2,148,270
TRAILER
Filed Jan. 7, 1937    5 Sheets-Sheet 3

Inventor
Raymond Koets
By Walter E. Schirmer
Atty.

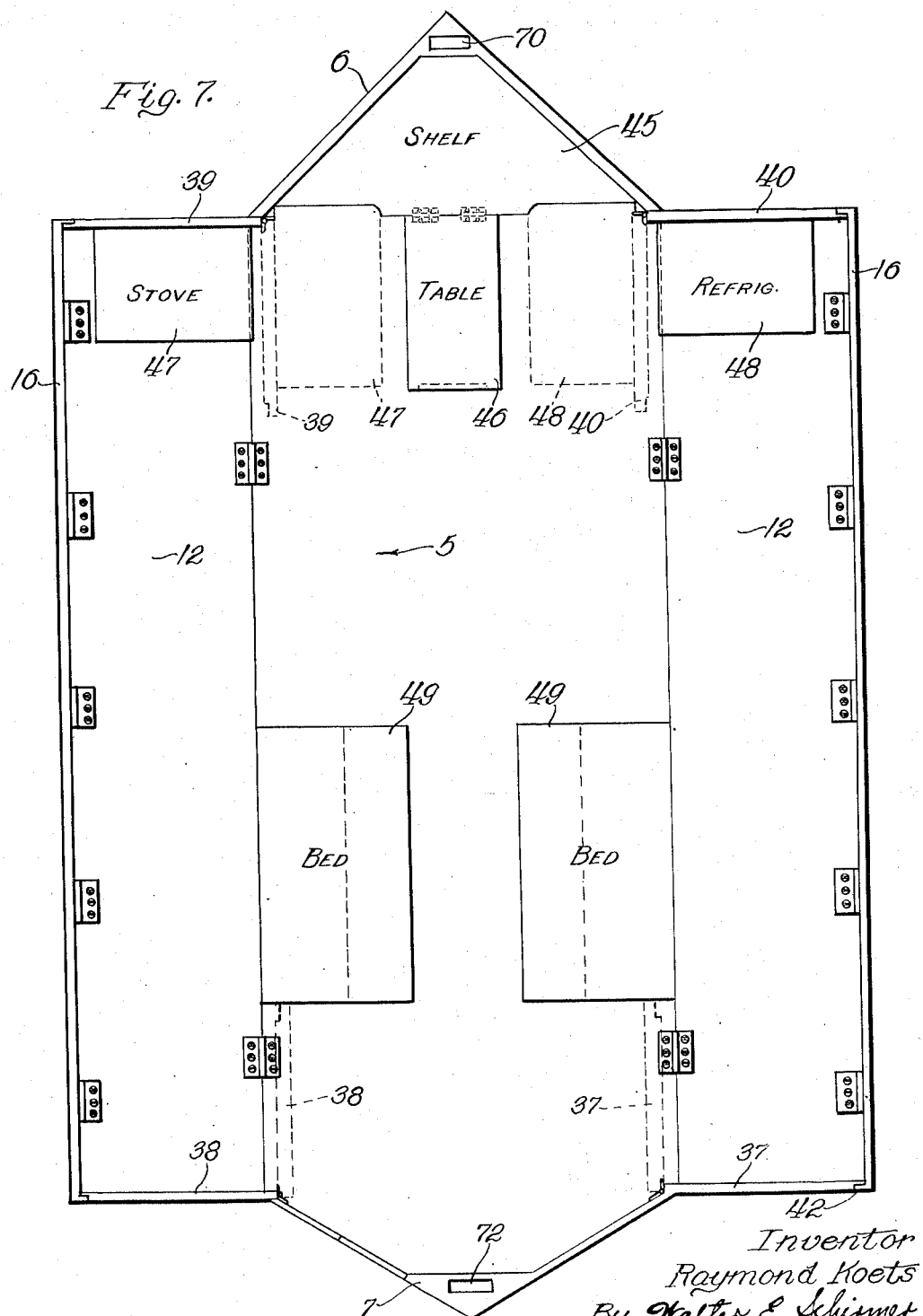

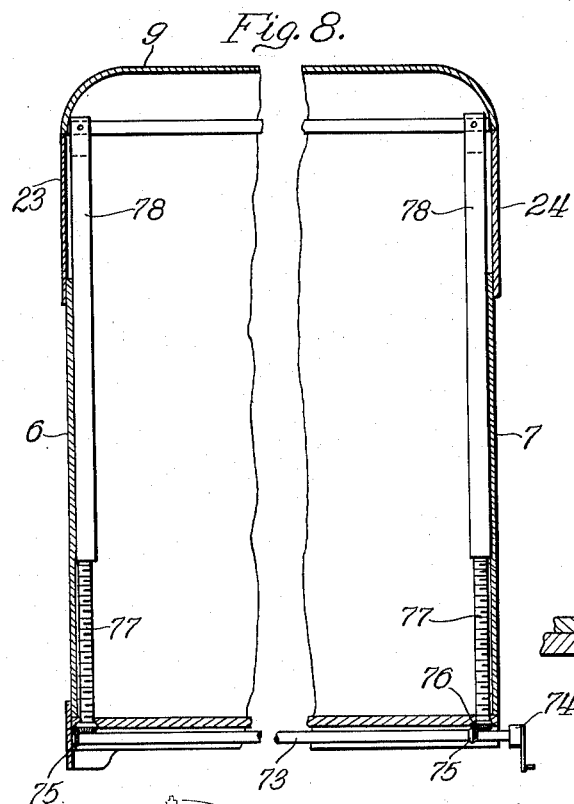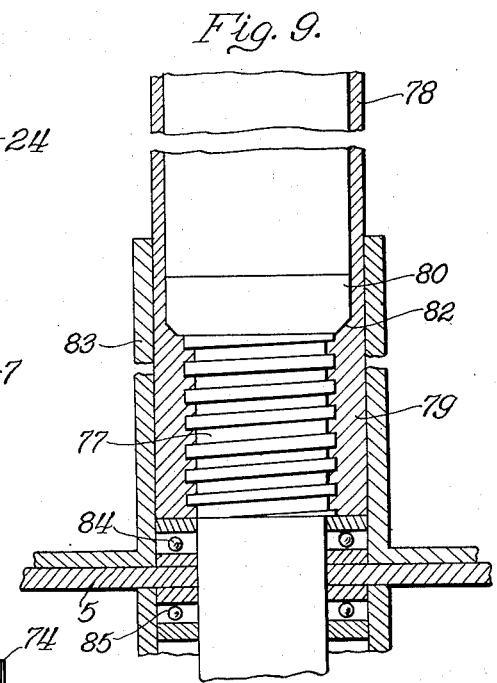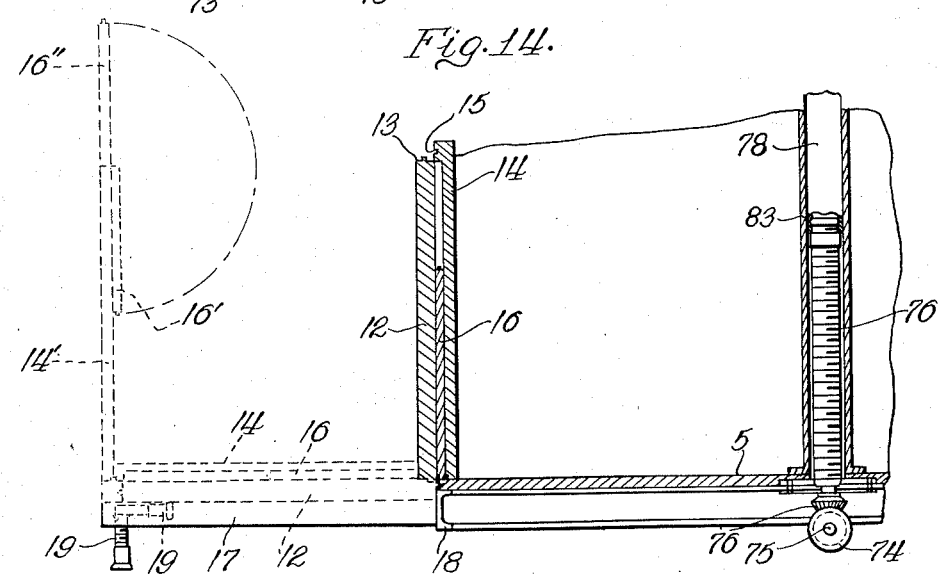

Patented Feb. 21, 1939

2,148,270

UNITED STATES PATENT OFFICE 2,148,270

TRAILER

Raymond Koets, Chicago, Ill.

Application January 7, 1937, Serial No. 119,412

7 Claims. (Cl. 296—23)

This invention relates to trailers, and more particularly is directed to trailers for passenger vehicles and the like to be used for camping and recreation purposes.

One of the main disadvantages of trailer constructions with which I am familiar is the bulk and size of the trailer, whereby it places a considerable load upon the automobile or other towing medium, and produces increased wind resistance. At the same time, the size of such trailers, if they are to be used as living quarters, is such as to present an undue hazard in driving, due to their width and height.

The present invention broadly contemplates a trailer which, when being towed, is of minimum height and width, being no higher than the customary automobiles now in common use. Further, the width of the trailer during travel is no greater than the width of the towing vehicle, thereby greatly facilitating its handling in traffic and materially decreasing its wind resistance at customary touring speeds. In addition, the weight of the trailer, due to improved features of construction and design, is reduced to an extent such that the power consumption and load stresses required in towing the same are maintained at a minimum.

One of the primary objects of the present invention is to provide a trailer which can be extended both vertically and laterally to provide, when parked, a room having a ceiling height and floor area sufficient to afford comfortable living quarters, and when collapsed for travelling presents material advantages of decreased wind resistance, light weight and easy mobility.

Another object of the present invention is to provide a construction wherein the lateral roof and floor extensions serve also as the side closing members for the trailer body when the trailer is placed in condition for travelling.

Still another advantage of the present invention is the provision of raising and lowering means for the roof and lateral roof extensions whereby these portions of the trailer may be easily raised and lowered conjointly, and which will maintain these portions in tightly clamped position to avoid movement or vibration when the trailer is being towed.

One of the advantages attained by the present construction is that the floor space of the trailer can be more than doubled when the trailer is made ready for occupancy, the two lower portions of the side walls being swung outwardly to form floor extensions coplanar with the floor of the trailer body. In connection with this feature I provide supporting sills in the bed of the trailer body which can be laterally extended to support the floor extension, and which carry hinged jack means at their outer ends capable of being swung downwardly to support the outer ends of the sills from the ground.

The trailer of the present invention essentially comprises a floor portion having permanent end walls, a roof portion having end portions in telescoping relation to said end walls whereby upon raising of the roof the end portions form vertical continuations of the end wals, complementary side wall portions hinged to the side edges of the roof and floor and swinging outwardly to form lateral roof and floor extensions when the roof is raised, folding wall members carried by said side wall portions for forming longitudinal sides at the outer edges of said extensions, and end closing wall members hinged to the edges of said end walls and movable outwardly to form end closures for the lateral extensions. Associated with these dominant features of the present trailer construction are a number of ancillary features, such as weatherproofing means between the wall portions, window and door arrangement, interior arrangement of the furnishings for the trailer, and the mechanical operating and latching mechanism, which produce, in the structure, desirable features of compactness, arrangements and design, all contributing to the provision of a trailer construction having the characteristics described.

Other objects and advantages of the present invention will be more apparent from the following detailed description which, taken in conjunction with the accompanying drawings, will disclose to those skilled in the art the particuar construction and operation of a preferred form of the present invention.

In the drawings:

Figure 1 is a perspective view of the trailer in condition for travelling;

Figure 2 is a similar view showing the trailer extended in position for occupancy;

Figure 3 is a side elevational view of the trailer in travelling position;

Figure 4 is a front elevational view of the tralier as shown in Figure 3;

Figure 7 is a floor plan view of the trailer;

Figure 8 is a somewhat diagrammatic illustration of the roof elevating mechanism;

Figure 9 is an enlarged sectional view of a portion of the elevating mechanism;

Figure 10 is a sectional view illustrating the linkage for swinging out the roof extensions;

Figures 11 to 13 illustrate the latching mechanism for holding the side wall members and extensions in clamped position; and Figure 14 is a transverse section through a portion of the trailer body illustrating the floor and side wall extensions.

Figure 5:
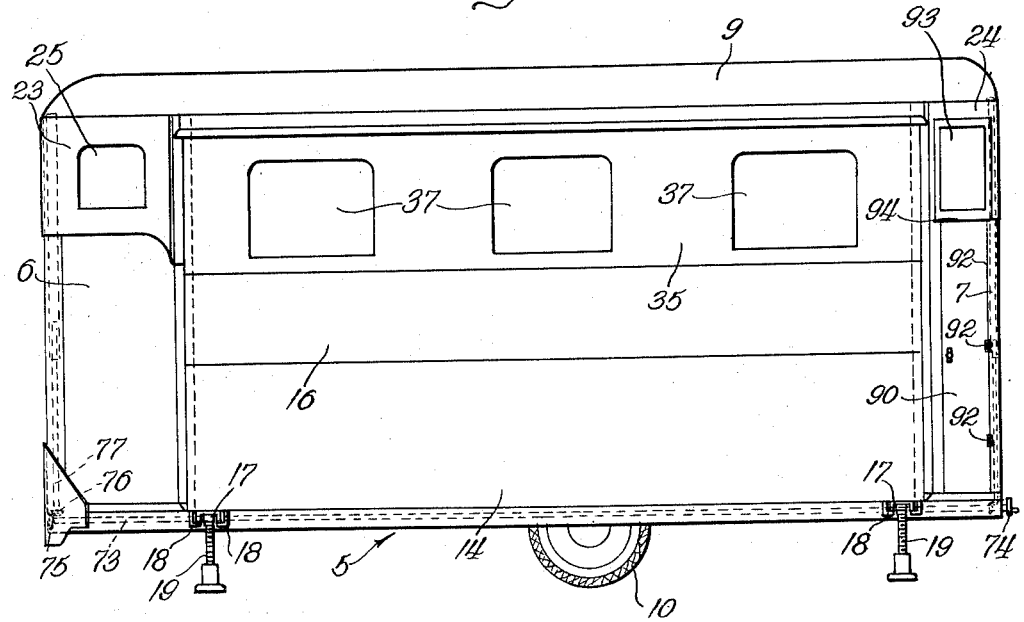
Figure 5 is a side elevational view of the trailer in extended position.

Referring now in detail to the drawings, the trailer bed is indicated generally at 5 and is provided with front and rear end walls 6 and 7, respectively, which may be arcuate in shape if desired or may be contoured to produce any desired appearance. In the front end of the trailer, the wall 6 is provided with a guard plate 8 which accommodates the hitching mechanism whereby the trailer is secured to the towing vehicle such as a passenger automobile or the like. The trailer is also provided with a roof portion 9 preferably formed of light weight construction with a waterproof cover stretched thereover and suitably painted or treated in any desired manner. The walls 6 and 7 of the truck may be formed of plywood, composition board or the like of relatively light weight which are treated or painted in any desired manner to provide a protective coating thereover and which preferably are formed with an air space therein (not shown) which may, if desired, be filled with insulating material.

It is to be understood that the particular construction of the structural panels which form the trailer body may be varied widely within the scope of the present invention, and any suitable or well known panel or wall construction may be employed.

The trailer body is preferably mounted upon a pair of wheels 10, suitably supported upon an axle extending transversely of the vehicle and preferably resiliently secured by means of springs to the under surface of the bed 5 of the trailer. If desired, a caster wheel may be provided at the front end of the trailer in order to support the same when it is disconnected from the towing vehicle but this is not essential to the present invention.

Figure 6:
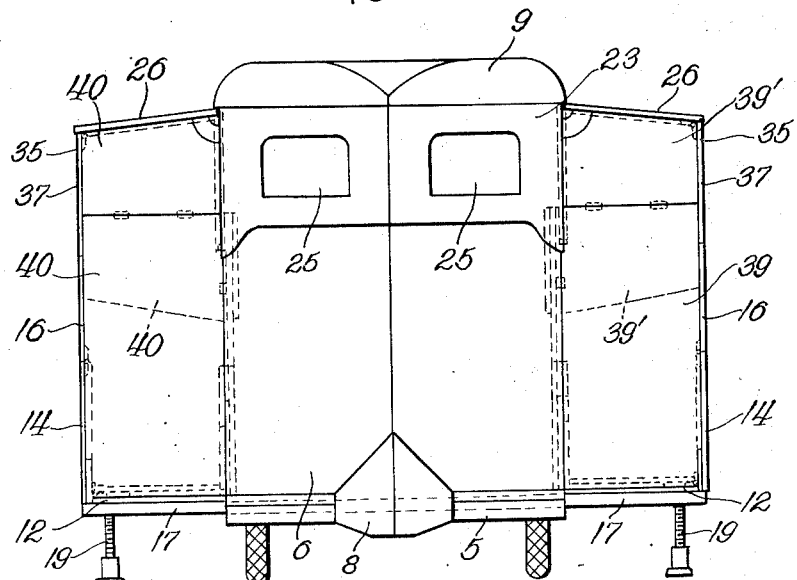
Figure 6 is a front elevational view of the trailer as shown in Figure 5.

Considering now Figures 1 to 7, inclusive, in connection with the construction of the trailer body, the bed 5 has hinged to opposite longitudinal edges, the panel members 12 which are adapted to be swung outwardly from the vertical position shown in Figures 1, 3 and 4 to the horizontal position shown in Figures 2, 5 and 6. These panels therefore, in effect, form side closing members when the trailer is positioned for travelling, and form lateral extensions of the floor when the trailer is arranged for occupancy. While I have shown this member as being provided with hinged supports at three points on the bed 5 of the vehicle, it is to be understood that it may, of course, be hinged at any number of points found necessary or desirable.

Hinged to the outer edges 13 of the members 12 is a second panel or wall member 14, which is provided with a tongue and groove engagement, indicated at 15, for providing a weatherproof connection therebetween when the member 14 is swung into a position at right angles to the member 13 as indicated at 14' in Figure 14. This provides the first upwardly extending portion of the longitudinal side wall formed at the outer ends of the lateral floor extensions 12 and is folded within the trailer body, as indicated in full lines in Figure 14, when the members 12 are folded upwardly to form the lower side closing panels as illustrated in Figures 1 and 4.

Hinged to the outer end of the member 14 is a third panel member 16 which is adapted to swing from the position shown at 16' in Figure 14 to the position shown at 16'' to form a vertical continuation of the extended side wall 14'. This member folds between the members 12 and 14 when the trailer is in collapsed position.

In order to support the floor extensions 12 when they are moved outwardly of the trailer body, I provide channel shaped sill members 17 which are adapted to have transverse sliding movement with respect to the car body on the guide channels 18, as indicated in Figure 5, and which move laterally out of the sides of the vehicle body to form sill supports for the opposite laterally extending floor extensions. These sills serve to provide support for the floor panels 12 at opposite ends thereof, and are preferably provided with hinged jack members 19 which can be swung into the dotted line position shown in Figure 14 when the sills are moved into the bed 5 to accommodate the jacks within the channel of the sills, but which swing outwardly when the sills are extended and serve to support the outer ends of the sills upon the ground or other supporting surface therebetween providing a strong and rigid support for the lateral floor extensions.

The roof 9 of the trailer is provided with end portions 23 and 24, preferably having windows formed therein as indicated at 25, and each of which comprises spaced members adapted to have telescoping relation with respect to the end walls 6 and 7 of the trailer body. Preferably, suitable weather stripping or the like is provided between the lower edges of the wall portions 23 and 24 and the surface of the walls 6 and 7 in order to prevent drafts or passage of extraneous material into the interior of the vehicle. If desired, these walls may be formed with a screen on the outer wall member which fits over the outer surface of the members 6 and 7 and with windows on the interior wall member which fits within the walls 6 and 7 thereof, although this arrangement of course is optional. The roof 9, together with the walls 23 and 24, is adapted to have vertical movement relative to the bed 5 and fixed end walls 6 and 7.

Thus, as shown in Figure 1, the roof 9 is in collapsed position with the walls 6 and 7 extending up into the walls 23 and 24 to a point immediately adjacent the lower edge of the roof. However, when the roof is raised from the position shown in Figures 3 and 4 to the position shown in Figures 5 and 6, the walls 23 and 24 are raised with respect to the walls 6 and 7 until the lower edges of these walls move into a position adjacent the upper edges of the walls 6 and 7. Thus the height of the trailer from the floor to the undersurface of the roof may be increased, for example, from 4' to 7' by this telescoping arrangement, thereby giving sufficient height within the trailer to enable the occupants thereof to stand therein while yet affording in the collapsed position, a compact structure which does not occupy as much height as is normally taken by the well known types of automobiles, thus materially decreasing the wind resistance of the trailer when attached to the vehicle.

Hinged to the opposite longitudinal edges of the roof intermediate the walls 23 and 24, are the roof extension panels or members 26 which may be hinged to the roof in a manner somewhat similar to the manner in which the floor extension members 12 are hinged to the bed or floor 5 of the trailer. At each end of the members 26, I provide an actuating arm 27 as shown in detail in Figure 10, rigidly secured to the inner surface of the members 26 and having an extending arm portion 28 pivoted as at 29 to an actuating link 30 which, in turn, is provided with a fixed pivot 32 secured to the end walls 6 and 7 of the trailer. When the roof is raised from the dotted line position shown in Figure 9 to the full line position, the link 30 forces the arm portion 28 of the arm 27 outwardly to cause the panel or roof extension member 26 to rotate about its pivots 33 away from the depending vertical position indicated in dotted lines in Figure 10, into a laterally extending position forming a continuation of the roof 9 at opposite sides of the vehicle.

The roof 9 is preferably provided with an overhanging portion 34 forming a seal or guard for the hinge connection 33 in order to prevent the entrance of moisture or the like therebetween, and both the panel member 26 and the roof are provided with a suitable weather-proofing joint corresponding to the joint indicated at 15 in Figure 14. Hinged to the outer edges of the members 26 are the panel members 35 which swing outwardly and downwardly as the members 26 are moved outwardly upon raising of the roof 9 to come into engagement with the upper edges of the members 16 as shown in Figure 6, thereby forming a continuation of the extended side wall formed by the members 14 and 16 to provide a closed side wall at the extended edges of the floor and roof extensions 12 and 26. The members 35 preferably carry a plurality of windows 37 therein forming windows in the extended side walls of the trailer when the roof is in raised position.

In order to close the ends of the laterally extending portions of the vehicle, I provide vertically hinged wall members 37, 38, 39 and 40 which are hinged to the respective edges of the fixed walls 6 and 7. The walls 37 to 40 swing in a horizontal plane from a position within the trailer body, as indicated in dotted lines in Figure 7, to a position extending at right angles to the longitudinal axis of the trailer body as indicated in full lines in Figure 7.

Each of the walls 37 to 40 is composed of hinged sections which are indicated by the corresponding primed reference numbers 37' to 40'. The upper portions of these walls swing downwardly about horizontal pivots into the dotted line positions shown in Figure 6 when the roof is to be lowered so that the upper edges of the walls are of no greater vertical height than the walls 6 and 7. However, when the roof is in raised position and the walls 37 to 40 are swung outwardly, the sections 37' to 40' are then raised upwardly to close in the space formed above the tops of the walls by reason of the extent to which the roof has been raised.

As shown in detail in Figure 7, I preferably provide a joint engagement, indicated at 42, between the vertical edges of the walls 37 to 40, and the corresponding vertical edges of the side walls formed by the members 14, 16 and 35. This provides suitable weather-proofing between these meeting edges, and additional weather-proofing may be provided between the roof extension members 26 and the top edges of the wall portions 37' to 40'.

Considering now in detail the interior of the trailer, at the forward end thereof I preferably provide a shelf indicated at 45 which extends horizontally within the recess formed by the angularly extending portions forming the wall 6. This shelf may contain a sink, storage cabinets and the like. Hinged to the outer edge of the shelf is a table 46 which may be swung downwardly when not in use, and may be swung upwardly into horizontal position when it is desired to use the table. Mounted on the inside surface of the wall 39 is a stove 47 which swings outwardly with this wall into position over the floor extension 12, and which swings inwardly with the wall into a position adjacent the shelf 45 and on one side of the table 46. Similarly, the wall 40 carries a refrigerator 48 which is conjointly movable therewith into and out of the position shown in dotted lines in Figure 7.

The upper portions of the wheels 10 of the vehicle are enclosed within suitable recesses formed in the floor or bed 5 of the trailer body, and studio couches 49 or the like may be mounted thereover in such position as to be extended laterally into the lateral extensions of the trailer when the trailer is in position for occupancy.

In order to secure the wall members 37 to 40 to the walls 14, 16 and 35, and to the floor and roof extensions 12 and 26, I provide suitable latching means illustrated in detail in Figures 11 to 13. This latching mechanism is also employed for securing the lower edge of the panel 35 to the upper edge of the panel 16 and for securing the meeting edges of the floor and roof extensions 12 and 26 together when the trailer is in the collapsed position shown in Figure 1.

The locking mechanism comprises a plate member 50, provided with suitable openings 52 for receiving screws or the like, which is adapted to be set in a recessed portion of the meeting edge of a wall, such as the wall or floor extension 12 as indicated in Figure 11. In the cooperating member such as the member 26 shown in Figure 11, I provide a lateral recess 53 and a longitudinal recess 54. A suitable latching member 55 having an extending curved finger or hook portion 56 is first inserted into the recess 54 subsequent to the insertion of the bushing or clip 57 in the rear end of the recess 53. The stud member 58 is then driven into the bushing 57 locking it in fixed position therein, and at the same time has the squared portion 59 thereof driven through a suitably formed aperture 60 in the member 55 to lock the member 55 to the stud for conjoint rotation therewith. The plate member 50 is provided with two longitudinal slots 62 which are adapted to be successively engaged by the hooked portion 56 or the member 55 when the spindle 58 is rotated by means of a suitable key secured over the extending end portion 63 of the spindle, whereby the hook is rotated through one aperture 62 into the recess in the member 12 and thence outwardly through the other aperture 62, thereby camming the meeting edges of the members 12 and 26 into firm engagement. This locking means is indicated generally at 65 in Figures 1 and 2, and it is to be understood that it may be provided at any point where such latching engagement is found necessary or desirable.

At the centers of the end walls 6 and 7, I provide suitable sockets 70 and 72 which are adapted to receive the operating mechanism whereby the roof may be raised and lowered.

Considering in detail Figures 8, 9 and 14, the operation of this mechanism will now be described.

Extending longitudinally within the bed 5 in a suitable channel provided for that purpose, is the shaft 73 which may be supported in suitable bearings or brackets in any desired manner as is well known in the art. The rear end of the shaft 73 projects outwardly from the end wall 7 and is adapted to carry a crank 74 for effecting rotation of this shaft. The shaft 73 is provided with a pair of bevel gears 75 at opposite ends thereof which are adapted to have meshing engagement with corresponding gears 76 carried by vertically extending thread shafts 77. The roof 9 is provided with a pair of depending tubular elements 78 secured to opposite ends thereof adjacent the walls 23 and 24 and within these walls, which members 78, as indicated in more detail in Figure 9 are provided with thickened end portions 79 threaded internally to receive the thread shaft 77.

Suitable stop means 80 is provided at the upper end of each of the shafts 77 and has seating engagement, as indicated at 82, with the thickened portion 79 of the tubes 78. Mounted on the floor 5 of the trailer is a guide tube 83 which has an internal diameter closely fitting about the external surface of the threaded arms 78. The guide tubes 83 extend upwardly from the floor 5 of the trailer a distance sufficient to accommodate the axial movement of the members 78 in the raising and lowering of the roof. Suitable thrust bearings 84 and 85 are provided for taking the weight of the roof during the raising and lowering movements.

In the operation of this structure, when the shaft 73 is rotated it produces conjoint rotation of the threaded vertically extending shafts 77. The rotation of these shafts cause the members 78 to move vertically with respect thereto, thus raising the roof when the shaft 73 is rotated in one direction, and drawing the roof downwardly into the locked position shown in Figure 9 when the shaft is rotated in the opposite direction. This provides the desired raising and lowering movement, and insures that the roof when in lowered position will be positively clamped by means of the engagement between the member 80 and the thickened portion 79 of the members 78 so that no relative vibration or movement may take place. This is a decided advantage in producing a quiet and positively locked structure. It is, of course, to be understood that other suitable threaded screw actuating arrangements might be employed without departing from the spirit of the present invention.

Referring now to Figure 5 it will be noted that a door 90 has been formed in the rear wall 7 of the trailer body and is vertically hinged as indicated at 92. The door is so constructed that its upper edge when the roof is in raised position, is disposed immediatly below the window 93, as indicated at 94 in Figure 5. The window 93 is hinged to the wall portion 24 for swinging movement in a horizontal plane in order to accommodate movement of the door when the roof is in lowered position although the window is adapted to be locked in fixed position when the roof is raised, the door in such case being free to move due to the clearance indicated at 94 which may be protected by suitable felt weather stripping or the like (not shown).

It is therefore believed apparent that I have provided a trailer structure having all the desired features of decreased wind resistance, lightweight and easy mobility when travelling, combined with the features of providing adequate living quarters and convenient arrangement of the interior when ready for occupancy. Due to the light weight construction of the panel members, the trailer may be readily raised into extended position or collapsed for travelling by a single individual, and if desired, the shaft 73 may be connected directly to the towing vehicle so as to be operated automatically by that vehicle instead of by the crank 74.

I do not intend to limit the present invention to the exact details shown and described, but only insofar as defined by the scope and spirit of the appended claims.

I claim:

1. In combination, a trailer body having a permanent floor and end walls, a roof having end portions telescoping with said end walls and movable vertically to form extensions thereof, means for raising and lowering said roof, complementary side wall portions hinged to the sides of said roof and floor for closing the sides of said body when said roof is lowered, said side wall portions forming lateral extensions of said roof and floor respectively when said roof is raised, means hinged to the free longitudinal edges of said extensions forming secondary complementary side wall portions when in extended position, and end wall means hinged to the vertical edges of said fixed end walls to provide end closing walls for said lateral extensions, said last-named means including horizontally hinged upper portions closing the portions of said extensions disposed between the top plane of said fixed end walls and said lateral roof extension, said end wall means extending beyond the joining edges of said secondary side wall portions to support the same in a vertical plane.

2. In a trailer body, a floor having vertically extending end walls, a roof having vertically depending end portions telescoping with said end walls, means for raising said roof whereby said end portions form vertical extensions of said end walls, panel members hinged at one edge thereof to the sides of said roof, link means secured to said end walls and to said panel members for swinging said panel members laterally outwardly upon raising of said roof to form lateral extensions of said roof, means hinged to the opposite edges of said panel members for forming vertically depending side walls when said panel members are swung outwardly, floor extensions hinged along one edge to the sides of said floor, said extensions swinging outwardly upon raising of said roof to form coplanar lateral extensions of said floor, and means hinged to the opposite edges of said floor extensions and including supplemental panel means of a width equal to the height the roof is raised and adapted for outward rotary movement into locked alinement with said depending side walls to complete said side walls between said roof and floor extensions.

3. In a trailer body, a floor having vertically extending end walls, a roof having vertically depending end portions telescoping with said end walls, means for raising said roof whereby said end portions form vertical extensions of said end walls, panel members hinged at one edge thereof to the sides of said roof, link means secured to said end walls and to said panel members for conjointly swinging said panel members laterally outwardly upon raising of said roof to form lateral extensions of said roof, means hinged to the opposite edges of said panel members for forming vertically depending side walls when said panel members are swung outwardly, floor extensions hinged along one edge to the sides of said floor, said extensions swinging outwardly upon raising of said roof to form coplanar lateral extensions of said floor, hinged double panels hingedly mounted on the outer edges of the floor extensions and extensible vertically a height such as to engage said depending side walls to close the same when the roof is raised, and means hinged to the vertical edges of said end walls and movable into parallel planes normal to said extensions and said vertical side walls and panels for closing the ends of said extensions and reinforcing said side walls and panels against lateral deflection at the joints thereof, said last-named means having horizontally hinged sections whereby upon lowering of said roof said sections are foldable into the trailer body within the peripheral limits of said floor.

4. In a trailer, a permanent floor having fixed vertical end walls, a weatherproof roof having fixed depending end wall portions telescoping said end walls and forming closed vertical extensions thereof when said roof is raised, side wall means hinged to the longitudinal edges of said roof between said end wall portions and extending partially down toward the side edges of said floor when said roof is in lowered position, complementary side wall means hinged to said edges of said floor and including supplemental folding portions adapted to compensate for the distance through which the roof is raised for closing the remaining portion of the sides of said trailer between said end walls, and means locking the meeting edges of both said side wall means in closed position to completely close the sides of said trailer during transit.

5. The trailer of claim 4 characterized in the provision of means for raising and lowering said roof including means for automatically swinging said side wall means outwardly as said roof is raised to form lateral roof extensions.

6. In a trailer, a permanent floor having fixed vertical end walls, a closed roof having end wall portions fixed thereto and in telescoping engagement with said end walls, means for raising and lowering said roof, means hinged to the longitudinal edges of said floor and roof forming lateral floor and roof extensions when said roof is raised, means hinged to the free longitudinal edge of said roof extension and adapted to be swung into vertical depending position to form a depending side wall portion for said roof extension, means hinged to the free edge of said floor extension and adapted to be swung upwardly into a side wall portion for said floor extension, said two side wall portions being spaced apart a distance substantially equal to that through which the roof is raised, and means hinged to the free edge of one of said side wall portions and movable into engagement with the free edge of the other side wall portion forming a closed side wall for said extensions.

7. The combination of claim 6 characterized by the provision of means hinged to the vertical edges of said fixed end walls and swinging into parallel planes normal to said extensions for closing the ends of said extensions.

RAYMOND KOETS.